(12) United States Patent
Vishveswaraiah et al.

(10) Patent No.: US 9,148,360 B2
(45) Date of Patent: Sep. 29, 2015

(54) MANAGING MAC MOVES WITH SECURE PORT GROUPS

(75) Inventors: Deepak Mysore Vishveswaraiah, Karnataka (IN); Mark A. Tassinari, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 13/876,898

(22) PCT Filed: Nov. 1, 2010

(86) PCT No.: PCT/US2010/054926
§ 371 (c)(1),
(2), (4) Date: Mar. 29, 2013

(87) PCT Pub. No.: WO2012/060808
PCT Pub. Date: May 10, 2012

(65) Prior Publication Data
US 2013/0182722 A1    Jul. 18, 2013

(51) Int. Cl.
*H04L 12/58*    (2006.01)
*H04L 12/751*   (2013.01)
*H04L 12/46*    (2006.01)
*H04L 29/06*    (2006.01)

(52) U.S. Cl.
CPC .............. *H04L 45/02* (2013.01); *H04L 12/467* (2013.01); *H04L 63/0236* (2013.01); *H04L 63/104* (2013.01)

(58) Field of Classification Search
CPC ... H04L 45/02; H04L 63/0236; H04L 12/467; H04L 63/104

USPC .......................................... 370/475, 401, 392
See application file for complete search history.

(56) References Cited

U.S. PATENT DOCUMENTS

| | | | |
|---|---|---|---|
| 6,041,058 A | 3/2000 | Flanders | |
| 6,859,433 B1 | 2/2005 | Chen | |
| 7,133,403 B1 | 11/2006 | Mo | |
| 7,508,757 B2 | 3/2009 | Ge | |
| 7,515,530 B2 | 4/2009 | Jain | |
| 7,653,743 B2 | 1/2010 | Kamentsky | |
| 2002/0016856 A1* | 2/2002 | Tallegas et al. | 709/238 |
| 2003/0033421 A1* | 2/2003 | Haeri et al. | 709/232 |
| 2006/0050741 A1* | 3/2006 | Shabtay et al. | 370/492 |
| 2007/0053296 A1 | 3/2007 | Yazaki | |

(Continued)

FOREIGN PATENT DOCUMENTS

| CN | 1725731 A | 1/2006 |
|---|---|---|
| CN | 1778077 | 5/2006 |

OTHER PUBLICATIONS

"Catalyst 2900 Series XL Installation and Configuration Guide," Chapter 2, Cisco Systems, Inc, (Dec. 1998).

(Continued)

*Primary Examiner* — Brian D Nguyen
(74) *Attorney, Agent, or Firm* — Law Office of Edouard Garcia

(57) ABSTRACT

A source MAC address is associated with a particular port that is a member of a secure group of ports of a network edge device. A move of the source MAC address to any port of the network edge device that is a member of the secure group of ports is allowed. Moves of the MAC address to any port of the network edge device that is outside the secure group of ports are disallowed.

20 Claims, 4 Drawing Sheets

(56) References Cited

U.S. PATENT DOCUMENTS

| | | |
|---|---|---|
| 2007/0118595 A1 | 5/2007 | Jain et al. |
| 2007/0162612 A1 | 7/2007 | Paggen |
| 2007/0268915 A1* | 11/2007 | Zelig et al. .................... 370/401 |
| 2008/0104278 A1* | 5/2008 | Ford et al. ...................... 709/250 |
| 2008/0253385 A1 | 10/2008 | Swain |
| 2008/0298371 A1 | 12/2008 | Kobatake |
| 2009/0019536 A1* | 1/2009 | Green et al. .................... 726/12 |
| 2009/0296727 A1 | 12/2009 | Srinivasan |
| 2010/0077067 A1* | 3/2010 | Strole ........................... 709/223 |
| 2010/0135307 A1 | 6/2010 | Nakagawa |

OTHER PUBLICATIONS

PCT; "Notification of Transmittal of the International Search Report and the Written Opinion of the International Searching Authority, or the Declaration"; cited in PCT/US2010/054926; mailed Aug. 12, 2011; 8 pages.

* cited by examiner

MANAGING MAC MOVES WITH SECURE PORT GROUPS

BACKGROUND

An edge device (e.g., a bridge or a router) is a network device that connects nodes in one network to nodes in another network. The edge device maintains a media access control (MAC) forwarding table that stores entries that map MAC addresses of network nodes to the ports of the network bridge. When an ingress packet is received at a port, the edge device performs a forwarding phase lookup of the destination MAC address in the received packet and a learning phase lookup of the source MAC address in the received packet.

In the forwarding phase lookup mode of operation, the edge device looks for the destination address in the received ingress packet in the MAC forwarding table. If an entry containing the destination address is found, the edge device forwards the packet to the port listed in the entry; otherwise, the edge device may "flood" the packet on all output ports of the edge device except the port on which the packet was received.

In the learning phase mode of operation, the edge device looks up the source address in the received ingress packet in the MAC forwarding table. If an entry containing the source address is not found, the edge device adds a new entry to the MAC forwarding table that maps the source address to the port on which the packet was received. If an entry containing the source address is found, the edge device determines whether the entry associates the source address with the current port on which the packet was received or a different port. If the current port is the same as the port listed in the identified forwarding table entry, the learning phase ends. If the current port is different from the port listed in the identified forwarding table entry, the edge device determines that the source address has moved (i.e., that a MAC move has occurred) and updates the MAC forwarding table to reflect the new MAC address to port mapping.

Some edge devices are configured to implement one or more security protocols. For example, an edge device may be restricted to a maximum number of source MAC addresses that can be learned for each VLAN (virtual local area network). In another example, the edge device may be configured to lock down the MAC forwarding table in response to receipt of a MAC lock down command. In accordance with these approaches, after the maximum number of source MAC addresses has been learned or the MAC lock down command has been received, the edge device discards packets that contain source MAC addresses that are not listed in the current MAC address table. In another example, the number of moves of the MAC address over time is tracked in order to detect and prevent bridge forwarding loops. If the number of MAC moves of a particular source MAC address over a given period is above a threshold number, the edge device may block all packets that are associated with that source MAC address and issue a loop detection warning.

Systems and methods of managing MAC moves with secure port groups are described herein.

DETAILED DESCRIPTION

Figure 1:
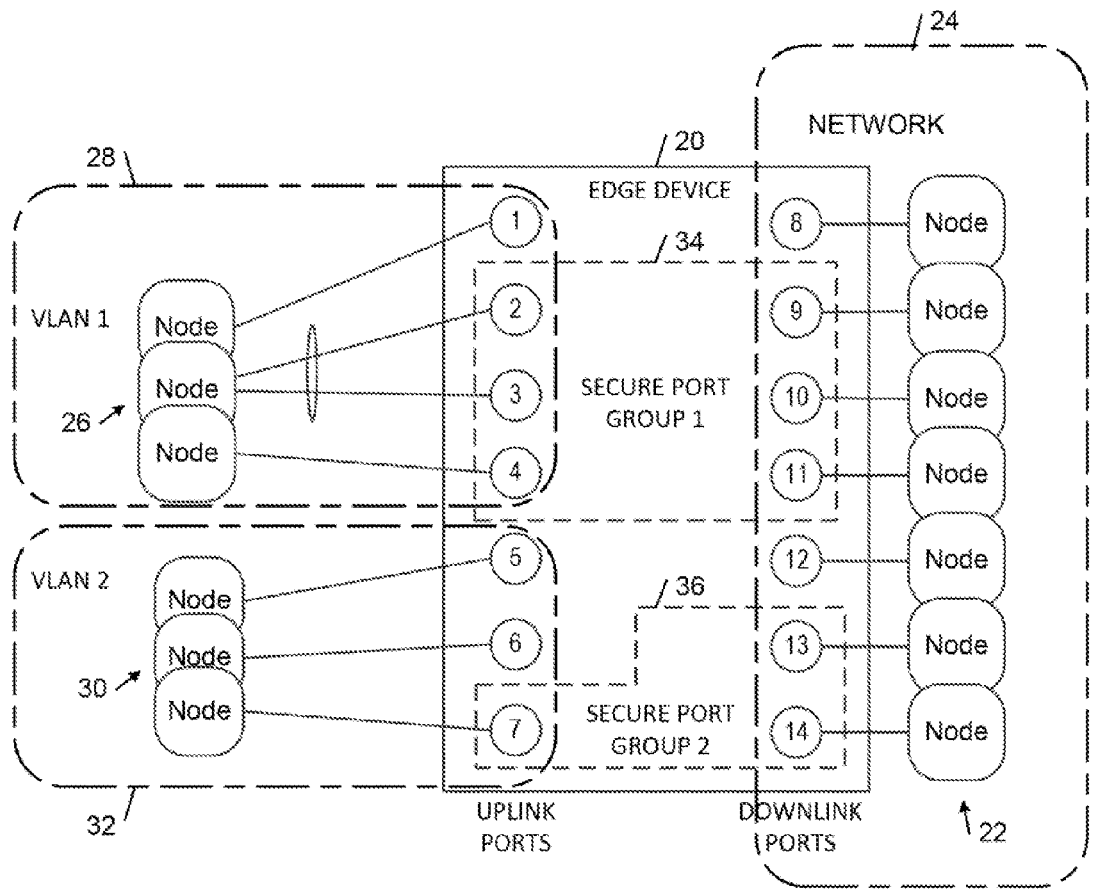
FIG. 1 is a diagrammatic view of an example of an edge device connecting network nodes in two virtual local area networks to the network nodes of another network.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "network node" (also referred to simply as a "node") is a junction or connection point in a communications network. Exemplary network nodes include, but are not limited to, a terminal, a computer, and an edge device. A "server" network node is a host computer on a network that responds to requests for information or service. A "client" network node is a computer on a network that requests information or service from a server. A "network connection" is a link between two communicating network nodes.

An "edge device" is a network device that connects nodes in one network to nodes in another network. Examples of edges devices include a bridge (e.g., a switch or a hub), routers, routing switches, integrated access devices (IADs), and multiplexers.

A virtual local area network (ULAN) is a switched network that is logically segmented into groups of nodes without regard to the physical locations of the nodes.

A media access control (MAC) address is a unique identifier that is assigned to a network interface for communications on a physical network segment.

A "secure port" is a port that controls which packets will be received and forwarded based on a specified set of one or more source MAC addresses.

A "secure port group" is a configurable group of secure ports of an edge device, where permitted source MAC addresses are restricted to moves between the ports in the secure port group.

As used herein, the term "includes" means includes but not limited to, the term "including" means including but not limited to. The term "based on" means based at least in part on.

The examples that are described herein provide systems and methods of managing MAC moves with secure port groups. In some of these examples, source MAC addresses are allowed to move between the ports of a specified port group, but are not allowed to move to ports outside of the specified port group. In this way, these examples can flexibly accommodate source MAC address moves without compromising security.

FIG. 1 shows an example of an edge device 20 that connects network nodes 22 in a first network 24 with network nodes 26 in a first VLAN 28 (VLAN 1) and network nodes 30 in a second VLAN 32 (VLAN 2).

The edge device 20 includes a plurality of ports (labeled 1-14) that are logically partitioned according to the first and second VLANs 28, 32. In particular, the edge device 20 maintains a data structure (e.g., a table or multiple tables) that assigns a VLAN ID corresponding to the first VLAN 28 to the uplink ports 1-4 and assigns a VLAN ID corresponding to the second VLAN 32 to the uplink ports 5-7. Although not shown, the ports 8-14 on the uplink side of the edge device 20 also may be partitioned into VLAN groups. Also not shown are alternate VLAN port configurations such as ports belonging to multiple VLANs. The VLAN port mapping data structure typically can be configured dynamically by a network administrator.

In addition to the VLAN partitions, the ports of the edge device 20 also are partitioned logically into a first secure port group 34 (Secure Port Group 1) and a second secure port group 36 (Secure Port Group 2). In particular, the edge device 20 maintains a data structure (e.g., a table or multiple tables) that assigns a Port Group ID corresponding to the first secure port, group 34 to the ports 2-4 and 9-10, and assigns a Port Group ID corresponding to the second secure port group 36 to the ports 7, 13, and 14. As explained in detail below, each of the ports 2-4, 9-10, 7, 13, and 14 is secure port that is restricted to forwarding packets having one or more specified source addresses and, for each secure port group 34, 36, the source MAC addresses that can be forwarded from the ports of the secure port group are restricted to moves between the ports of the secure port, group.

Figure 2:
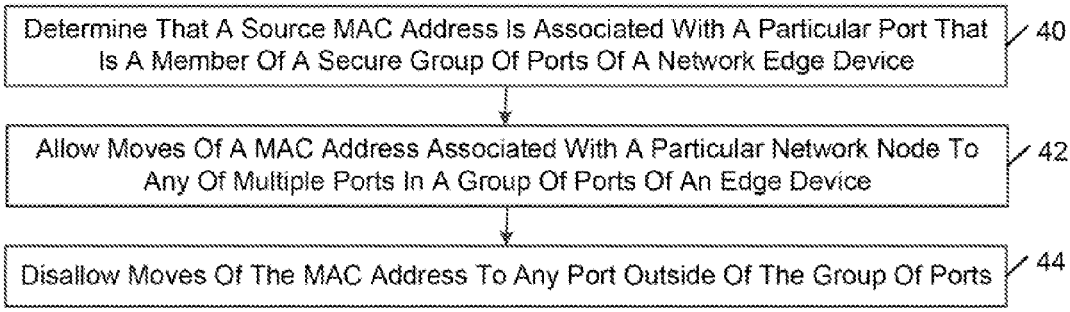
FIG. 2 is a flow diagram of an example of a method of managing moves of a media access control (MAC) address.

FIG. 2 is a flow diagram of an example of a method of managing moves of a media access control (MAC) address with secure port groups. In accordance with the method of FIG. 2, the edge device 20 determines that a source MAC address is associated with a particular port that is a member of a secure group of ports of a network edge device (FIG. 2, block 40). The edge device 20 allows a move of the source MAC address to any port of the network edge device 20 that is a member of the secure group of ports (FIG. 2, block 42). The edge device 20 disallows moves of the MAC address to any port of the network edge device that is outside the secure group of ports (FIG. 2, block 44).

Figure 3:
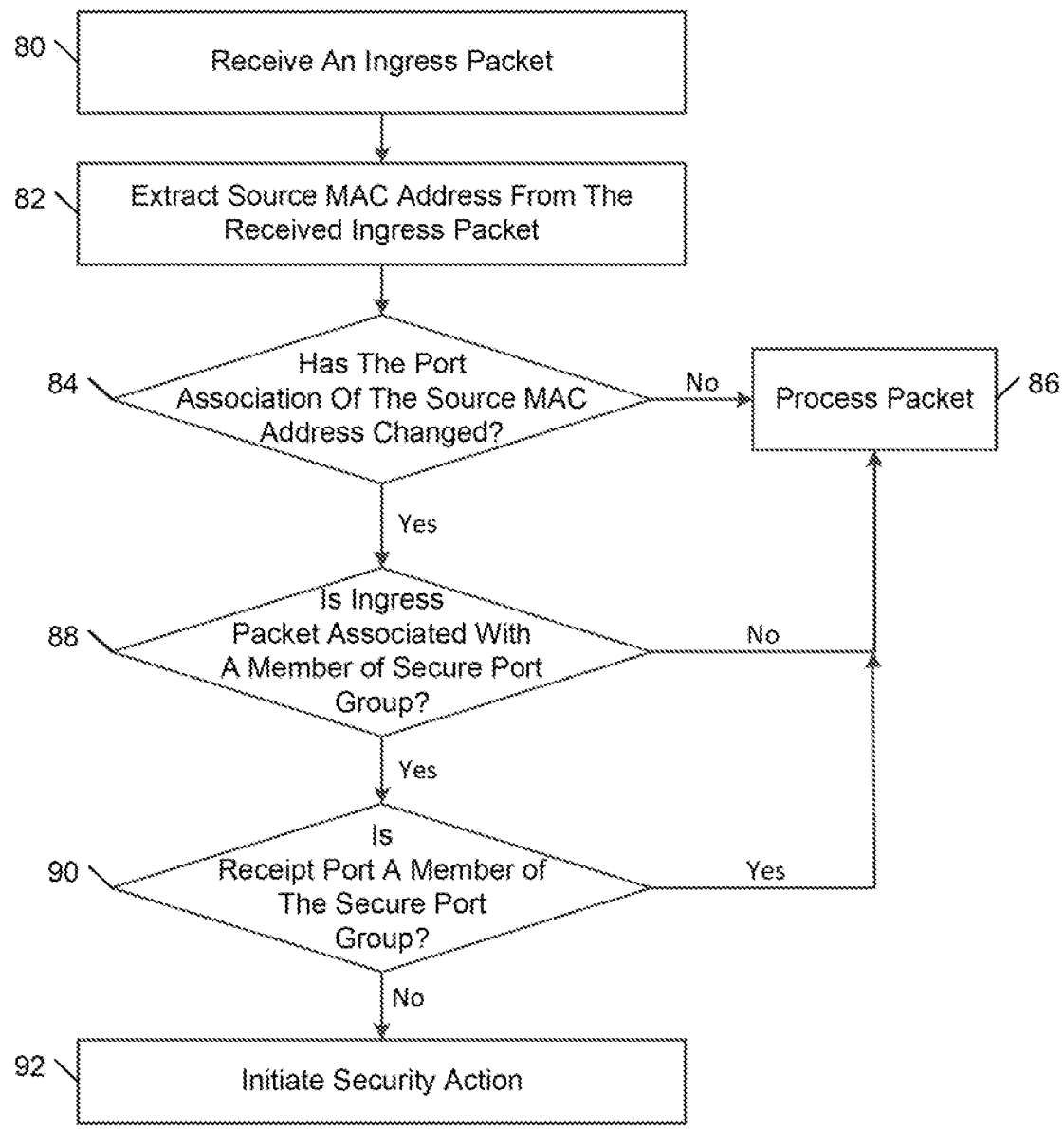
FIG. 3 is a flow diagram of an example of a method of managing moves of a media access control (MAC) address.

FIG. 3 shows an example of a method by which the edge device 20 manages moves of a media access control (MAC) address with secure port groups. In accordance with the method of FIG. 3, the edge device 20 receives an ingress packet (FIG. 3, block 80). The edge device 20 extracts a source MAC address from the received ingress packet (FIG. 3, block 82). If the port association of the source MAC address has not changed (FIG. 3, block 84), the edge device 20 processes the packet (FIG. 3, block 86). If the port association of the source MAC address has changed (FIG. 3, block 84), the edge device 20 determines whether or not the ingress packet is associated (e.g., by an entry in a MAC address table) with a port that is a member of a restricted port group (FIG. 3, block 88) If the ingress packet is not associated a member of a secure port group, the edge device processes the packet (FIG. 3, block 86). If the ingress packet is associated with a member of a secure port group, the edge device determines whether or not the receipt port is a member of the secure port group (FIG. 3, block 90). If the receipt port is a member of the secure port group, the edge device processes the packet (FIG. 3, block 86). If the receipt port is not a member of the secure port group, the edge device 20 initiates a security action (e.g., filter the packet and issue security warning) (FIG. 3, block 92).

Figure 4:
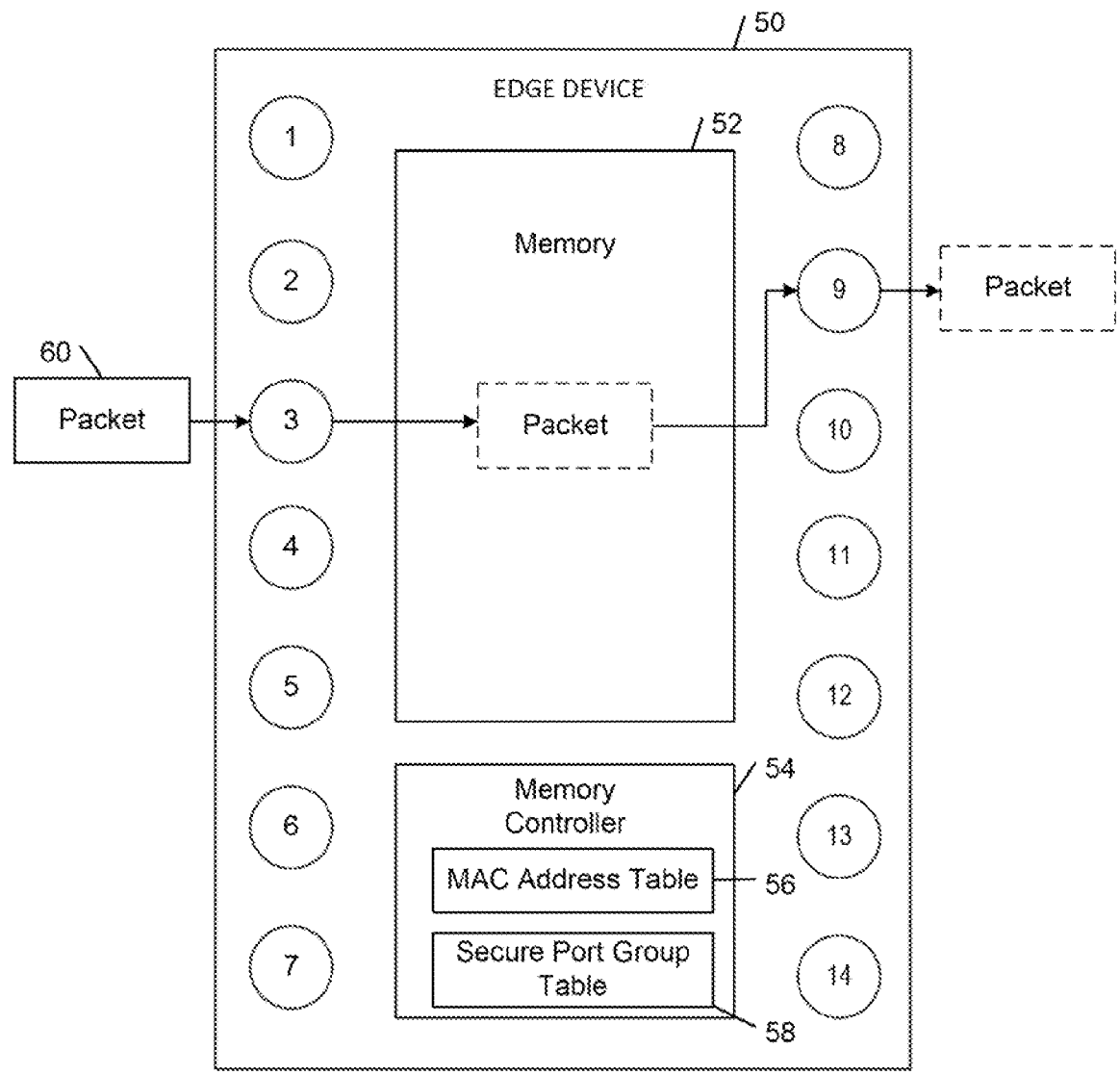
FIG. 4 is a block diagram of an example of an edge device.

FIG. 4 shows an example 50 of the edge device 20 that includes a plurality of ports 1-14, a memory 52, and a memory controller 54, which in turn includes a MAC address table 56 and a secure port group table 58. The ports 1-14, the memory 52, and the memory controller 54 typically are components of a single integrated circuit that are interconnected by a bus. In some examples, the memory controller 54 includes a programmable digital circuit that is operable to carry out the memory controller functions described herein. In some example, the memory controller 54 is includes a processor that executes instructions stored on at least one computer-readable medium. In some examples, one or both of the MAC address table 56 and the secure port group table 58 are stored on a memory device that is separate from the edge device 50 and is accessible to the memory controller 54 over a wired or wireless network connection.

When an ingress packet 60 is received on a port (e.g., port 3) of the edge device 50, the receipt port stores the packet in the memory 52 and extracts information from the header of the packet. In some examples, the receipt port extracts the source MAC address, the destination MAC address, and the VLAN ID from the packet header. The receipt port passes the extracted information and its Port ID to the memory controller 54.

The memory controller 54 determines whether or not the Port ID of the receipt port is a member of a secure port group based on the entries of the secure port group table 58.

If the Port ID of the receipt port is a member of a secure port group, the memory controller 54 determines if the extracted source MAC address is permitted to be received on the corresponding port based on the entries of the same secure port group table 58. If the source MAC address of the received packet is not a permitted source address, the packet is filtered (e.g., the packet is discarded) and optionally issues a security warning. If the source MAC address is a permitted source address, the memory controller 54 determines if a MAC move has occurred. In this process, the memory controller 54 searches the MAC address table 56 for an entry that associates an ingress port with the source MAC address and the VLAN ID that were extracted from the ingress packet.

If an entry for the source MAC address and VLAN ID of the received packet is found in the MAC table, the memory controller 54 compares the Port ID of the input port in the table entry to the Port ID of the receipt port. If these Port IDs are different, a MAC move is being attempted. If a MAC move is being attempted, the memory controller 54 determines whether the current packet's receipt port is a member of the same secure port group as the input port in the existing MAC table entry based on the entries of the secure port group table 58.

If the receipt port is a member of the same secure port group, the MAC move is permitted. In this case, the memory controller 54 updates the MAC address table 56 entry that associates the receipt port with the extracted source MAC address and VLAN ID; the memory controller 54 also searches the MAC address table 56 for an entry that associates an output port with the destination MAC address and the VLAN ID that were extracted from the ingress packet. If an entry for the destination MAC address and VLAN ID is found, the memory controller 54 transfers the packet 60 from the storage address in the memory 52 to the output port (e.g., port 9) listed in the entry. If an entry for the destination MAC address and VLAN ID is not found, the memory controller 54 floods the packet 60 from the memory 52 to all the available ports.

In some implementations, if the output port is not a member of the same secure port group as the receipt port, the memory controller 54 may optionally filter the packet (e.g., discards the packet) and optionally issues a security warning.

If the receipt port is a member of a secure port group and the source MAC address is a permitted source address for the same secure port group but an entry for the source MAC address and VLAN ID is not found in the MAC address table 56, the memory controller 54 creates a new entry in the MAC address table 56 that associates the Port ID of the receipt port with the source MAC address and the VLAN ID that were extracted from the ingress packet.

If the Port ID of the receipt port is a not member of a secure port group, the memory controller 54 searches the MAC address table 56 for an entry that associates the source MAC address and VLAN ID that were extracted from the ingress packet with an input port.

If the Port ID of the receipt port is a not member of a secure port group and an entry for the source MAC address and VLAN ID is found in, the MAC address table 56, the memory controller determines whether the port associated with the existing MAC table entry is a member of a secure port group. If that port is a member of a secure port group, there is an attempt to move the source MAC address outside the secure port group and in this case the memory controller 54 filters the packet (e.g., discards the packet) and optionally issues a security warning. If that port is not a member of a secure port group then the address move is processed normally and the packet is forwarded. If the Port ID of the receipt port is a not member of a secure port group and an entry for the source MAC address and VLAN ID is not found in the MAC address table 56, the memory controller 54 creates a new entry in the MAC address table 56 that associates the Port ID of the receipt port with the source MAC address and the VLAN ID that were extracted from the ingress packet. The memory controller 54 also searches the MAC address table 56 for an entry that associates an output port with the destination MAC address and the VLAN ID that were extracted from the ingress packet. If an entry for the destination MAC address and VLAN ID is found, the memory controller 54 transfers the packet 60 from the storage address in the memory 52 to the output port (e.g., port 9) listed in the entry. If an entry for the destination MAC address and VLAN ID is not found, the memory controller 54 floods the packet 60 from the memory 52 to all the permitted ones of the available ports.

Figure 5:
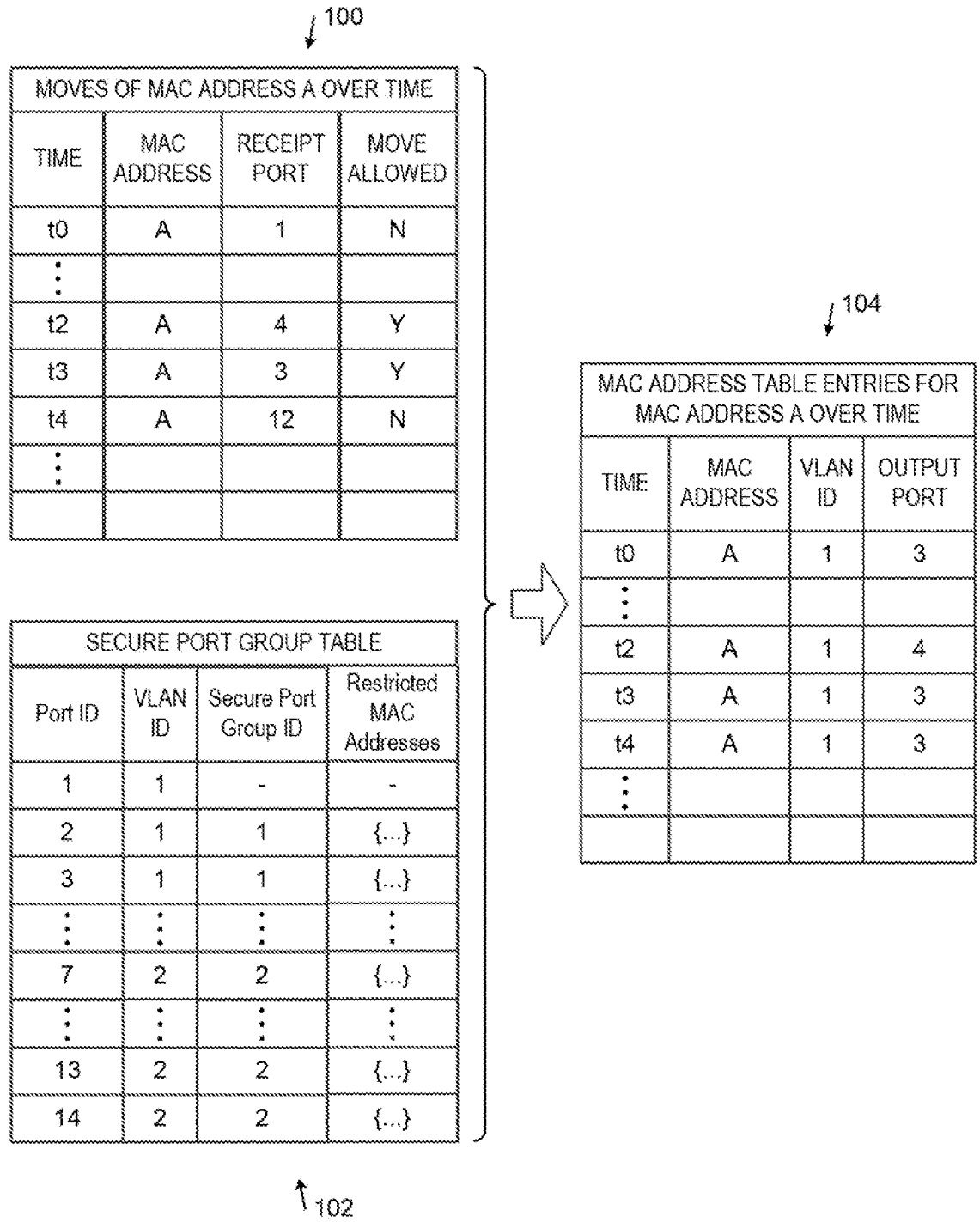
FIG. 5 is a diagrammatic view of an example of a table showing moves of a MAC address over time, an example of a table that maps ports of an edge device to secure port groups, and an example of a table showing MAC address table entries for the MAC address over time.

FIG. 5 shows an example of a table 100 of moves of a MAC address A over time, a secure port group table 102 that maps ports of an edge device to secure port groups, and a table 104 that contains MAC address table entries for the MAC address A over time. The secure port group table 102 stores the associations between secure port groups, Port IDs, VLAN IDs, and restricted MAC addresses. In this example, ports 2, 3, 4, 9, 10, and 11 are members of secure port group 1, and ports 7, 13, and 14 are members of secure port group 2 (see FIG. 1). At time t0, the source MAC address A is associated with secure port group 1, as shown by the first entry in the MAC address table 104. Thus, as shown in the table 100, moves of MAC address A to ports 4 and 3 at times t2 and t3 are allowed, whereas moves of MAC address A to ports 1 and 12 at times t0 and t4 are not allowed. This is reflected in the MAC address table 104, which shows that only the permitted moves of the MAC address A between the ports 3 and 4 trigger updates to the port associations of MAC address A.

Examples of the edge devices 20, 50 may be implemented by one or more discrete modules (or data processing components) that are not limited to any particular hardware, or machine readable instruction configuration (e.g., firmware or software). In the illustrated examples, these modules may be implemented in any computing or data processing environment, including in digital electronic circuitry (e.g., an application-specific integrated circuit, such as a digital signal processor (DSP)) or in computer hardware, device driver, or machine readable instructions (including firmware or software). In some examples, the functionalities of the modules are combined into a single data processing component. In some examples, the respective functionalities of each of one or more of the modules are performed by a respective set of multiple data processing components.

In some implementations, process instructions (e.g., machine-readable code, such as computer software) for implementing the methods that are executed by the examples of the edge devices 20, 50, as well as the data they generate, are stored in one or more machine-readable media. Storage devices suitable for tangibly embodying these instructions and data include all forms of non-volatile computer-readable memory, including, for example, semiconductor memory devices, such as random access memory (RAM), EPROM, EEPROM, and flash memory devices, magnetic disks such as internal hard disks and removable hard disks, magneto-optical disks, DVD-ROM/RAM, and CD-ROM/RAM.

In general, examples of the edge device 20 may be implemented in any one of a wide variety of electronic devices, including dedicated function edge devices (e.g., bridges, such as a switch or a hub, routers, routing switches, integrated access devices, and multiplexers) and general purpose computers.

Other embodiments are within the scope of the claims.

The invention claimed is:

1. A method, comprising:
   determining, by a network edge device, that a source MAC address is associated with a particular port that is a member of a secure group of ports of the network edge device;
   allowing a move of the source MAC address to any port of the network edge device that is a member of the secure group of ports; and
   disallowing moves of the source MAC address to any port of the network edge device that is outside the secure group of ports.

2. The method of claim 1, wherein the determining comprises searching for an association between the port associated with the source MAC address and the secure port group in a table accessible by the network edge device.

3. The method of claim 1, further comprising extracting the source MAC address from a network packet received on a particular port of the network edge device, and detecting a move of the source address based on the extracted source MAC address.

4. The method of claim 3, wherein the detecting comprises:
searching for an association between a port of the network edge device and the extracted source MAC address; and
based on a successful search for the association, determining that a move of the source MAC address has occurred based on a comparison of the associated port and the particular port.

5. The method of claim 1, further comprising:
extracting the source MAC address from a network packet received on a particular port of the network edge device;
searching for an association between the extracted source MAC address and a respective port of the network edge device; and
based on an unsuccessful search for the association, associating the source MAC address with the particular port.

6. The method of claim 1, further comprising updating a table accessible by the network edge device to reflect allowed moves of the source MAC address to respective ports of the network edge device that are members of a same secure group of ports.

7. The method of claim 1, wherein the disallowing comprises discarding packets containing the source MAC address that are received on respective ports of the network edge device that are not members of a same secure group of ports.

8. The method of claim 1, further comprising creating an entry in a table accessible by the network edge device, wherein the entry associates the source MAC address with the particular port.

9. The method of claim 1, further comprising:
extracting a source MAC address from a network packet received on a particular port of the network edge device that is a member of the secure group of ports; and
based on a determination that the extracted source MAC address is associated with a particular port that is outside the secure group of ports, initiating a security action.

10. The method of claim 1, wherein allowing the move of the source MAC address comprises updating a MAC address table entry of the network edge device that associates a receipt port of a packet containing the source MAC address with the source MAC address and a virtual local area network identifier extracted from the packet, wherein the receipt port is a member of the secure group of ports.

11. Apparatus, comprising:
a memory; and a programmable digital circuit coupled to the memory and the programmable digital circuit is to perform operations comprising
determining that a source MAC address is associated with a particular port that is a member of a secure group of ports of a network edge device;
allowing a move of the source MAC address to any port of the network edge device that is a member of the secure group of ports; and
disallowing moves of the MAC address to any port of the network edge device that is outside the secure group of ports.

12. The apparatus of claim 11, wherein the programmable digital circuit is to perform operations comprising:
extracting the source MAC address from a network packet received on a particular port of the network edge device;
detecting a move of the source MAC address based on the extracted source MAC address; and
in the detecting, searching for an association between a port of the network edge device and the extracted source MAC address and, based on a successful search for the association, determining that a move of the source MAC address has occurred based on a comparison of the associated port and the particular port.

13. The apparatus of claim 11, wherein the programmable digital circuit is to perform operations comprising:
updating a table accessible by the network edge device to reflect allowed moves of the source MAC address to respective ports of the network edge device that are members of a same secure group of ports; and
in the disallowing, discarding packets containing the source MAC address that are received on respective ports of the network edge device that are not members of the secure group of ports.

14. The apparatus of claim 11, wherein the programmable digital circuit is to perform operations comprising:
extracting a source MAC address from a network packet received on a particular port of the network edge device that is a member of the secure group of ports; and based on a determination that the extracted source MAC address is associated with a particular port that is outside the secure group of ports, initiating a security action.

15. The apparatus of claim 11, wherein allowing the move of the source MAC address comprises updating a MAC address table entry that associates a receipt port of a packet containing the source MAC address with the source MAC address and a virtual local area network identifier extracted from the packet, wherein the receipt port is a member of the secure group of ports.

16. At least one non-transitory computer-readable medium having processor-readable program code embodied therein, the processor-readable program code adapted to be executed by a processor to implement a method comprising:
determining that a source MAC address is associated with a particular port that is a member of a secure group of ports of a network edge device;
allowing a move of the source MAC address to any port of the network edge device that is a member of the secure group of ports; and
disallowing moves of the source MAC address to any port of the network edge device that is outside the secure group of ports.

17. The at least one non-transitory computer-readable medium of claim 16, wherein the method comprises:
extracting the source MAC address from a network packet received on a particular port of the network edge device; and
detecting a move of the source MAC address based on the extracted source MAC address;
wherein the detecting comprises searching for an association between a port of the network edge device and the extracted source MAC address and, based on a successful search for the association, determining that a move of the source MAC address has occurred based on a comparison of the associated port and the particular port.

18. The at least one non-transitory computer-readable medium of claim 16, wherein determining the source MAC address is associated with the particular port comprises searching for an association between the source MAC address and the particular port in a table accessible by the network edge device.

19. The at least one non-transitory computer-readable medium of claim 16, wherein allowing the move of the source MAC address comprises updating a MAC address table entry that associates a receipt port of a packet containing the source MAC address with the source MAC address and a virtual local area network identifier extracted from the packet.

20. The at least one non-transitory computer-readable medium of claim 19, wherein the receipt port is a member of the secure group of ports.

* * * * *